United States Patent
Bode et al.

(10) Patent No.: US 7,069,103 B1
(45) Date of Patent: Jun. 27, 2006

(54) CONTROLLING CUMULATIVE WAFER EFFECTS

(75) Inventors: Christopher A. Bode, Austin, TX (US); Matthew A. Purdy, Austin, TX (US)

(73) Assignee: Advanced Micro Devices, Inc.

( * ) Notice: Subject to any disclaimer, the term of this patent is extended or adjusted under 35 U.S.C. 154(b) by 291 days.

(21) Appl. No.: 10/184,814

(22) Filed: Jun. 28, 2002

(51) Int. Cl.
*G06F 19/00* (2006.01)

(52) U.S. Cl. .............. 700/121; 700/105; 700/108; 700/109; 700/110; 438/5; 438/14; 438/714

(58) Field of Classification Search ........ 700/121, 700/108, 109, 110, 100, 105; 438/5, 7, 14, 438/430, 431, 714
See application file for complete search history.

(56) References Cited

U.S. PATENT DOCUMENTS

| | | | |
|---|---|---|---|
| 3,751,647 A * | 8/1973 | Maeder et al. | 713/401 |
| 5,495,417 A * | 2/1996 | Fuduka et al. | 700/121 |
| 5,528,510 A * | 6/1996 | Kraft | 700/95 |
| 5,694,325 A * | 12/1997 | Fukuda et al. | 700/121 |
| 5,822,218 A * | 10/1998 | Moosa et al. | 700/121 |
| 5,923,553 A * | 7/1999 | Yi | 700/121 |
| 6,041,270 A * | 3/2000 | Steffan et al. | 700/121 |
| 6,161,054 A * | 12/2000 | Rosenthal et al. | 700/121 |
| 6,223,097 B1 * | 4/2001 | Hashimoto et al. | 700/121 |
| 6,298,470 B1 * | 10/2001 | Breiner et al. | 716/4 |
| 6,456,894 B1 * | 9/2002 | Nulman | 700/121 |
| 6,587,744 B1 * | 7/2003 | Stoddard et al. | 700/121 |
| 6,656,023 B1 * | 12/2003 | Molnar | 451/41 |

* cited by examiner

*Primary Examiner*—Jayprakash N. Gandhi
*Assistant Examiner*—Charles Kasenge
(74) *Attorney, Agent, or Firm*—Williams Morgan & Amerson, P.C.

(57) ABSTRACT

A method and apparatus provided for controlling cumulative wafer effects. The method comprises processing a workpiece, determining a cumulative effect of the processing on the workpiece and comparing the determined cumulative effect to a reference target value. The method further comprises adjusting a downstream process of the workpiece based on comparing the determined cumulative effect to the reference target value.

22 Claims, 2 Drawing Sheets

CONTROLLING CUMULATIVE WAFER EFFECTS

BACKGROUND OF THE INVENTION

1. Field of the Invention

This invention relates generally to a semiconductor fabrication process, and, more particularly, to controlling cumulative wafer effects in the semiconductor fabrication process.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in continual improvements in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

During the fabrication process, various events may take place that affect the performance of the devices being fabricated. That is, variations in the fabrication process result in device performance variations. Factors, such as feature critical dimensions, doping levels, contact resistance, particle contamination, etc., may potentially affect the end performance of the device. Various tools in the processing line are controlled, in accordance with performance models, to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., which equates to increased profitability.

Semiconductor manufacturing processes, which have become increasingly more reliable and robust, may include a plurality of processing tools that cooperate with each other to process semiconductor devices, such as microprocessors, memory devices, ASICs, etc. Typically, workpieces, such as semiconductor wafers, are exposed to a sequence of processes within the manufacturing process, where the sequence of processes may have some cumulative effect on the wafers, as the wafers progress from one processing tool to another. One example of a cumulative effect is oxide loss that occurs over the process life cycle of the wafer. That is, wafers having an oxide layer deposited initially therein may experience oxide loss caused by the different processes, such as etching, cleaning, and the like, as the wafers proceed through the manufacturing system 100. Similarly, other types of cumulative effects may also occur throughout the process life cycle of a wafer. These cumulative effects, if excessive, however, can sometimes have a deleterious effect on the overall process, as wastage of wafers may occur because of misprocessing.

The present invention is directed to overcoming, or at least reducing the effects of, one or more of the problems set forth above.

SUMMARY OF THE INVENTION

In one embodiment of the present invention, a method is provided for controlling cumulative wafer effects. The method comprises processing a workpiece, determining a cumulative effect of the processing on the workpiece and comparing the determined cumulative effect to a reference target value. The method further comprises adjusting a downstream process of the workpiece based on comparing the determined cumulative effect to the reference target value.

In another embodiment of the present invention, an apparatus is provided for controlling cumulative wafer effects. The apparatus comprises a control unit communicatively coupled to an interface. The control unit is adapted to track a cumulative effect based on processing of a wafer by one or more processing tools and adjust downstream processing of the wafer based on the cumulative effect.

In a further embodiment of the present invention, an article comprising one or more machine-readable storage media containing instructions is provided for controlling cumulative wafer effects. The one or more instructions, when executed, enable the processor to track a cumulative effect based on processing of a wafer by one or more processing tools and adjust downstream processing of the wafer based on the cumulative effect.

BRIEF DESCRIPTION OF THE DRAWINGS

The invention may be understood by reference to the following description taken in conjunction with the accompanying drawings, in which like reference numerals identify like elements, and in which.

Figure 1:
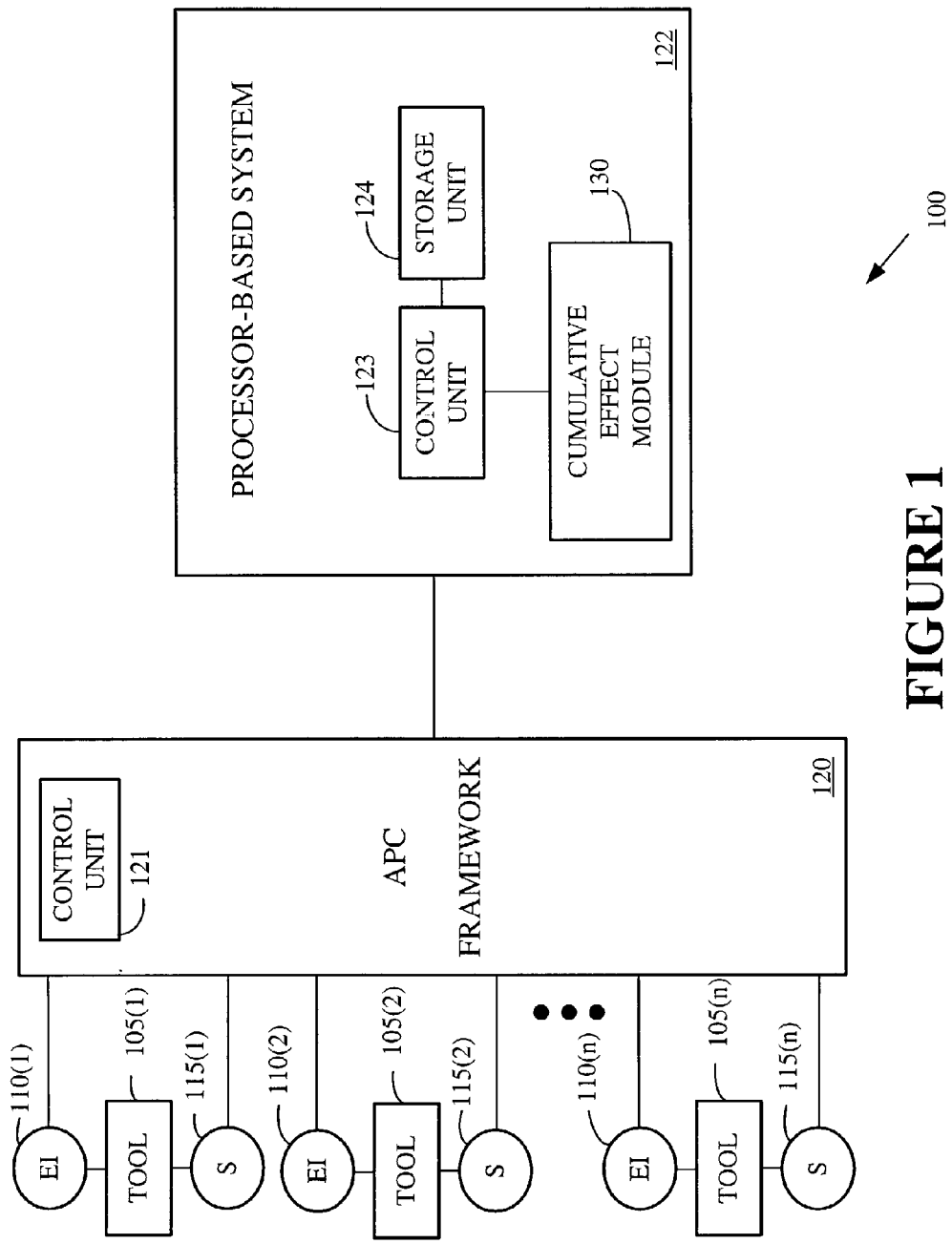
FIG. 1 illustrates a manufacturing system, including an APC framework, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a manufacturing system 100 for a semiconductor fabrication process is illustrated in accordance with one embodiment of the present invention. Although the invention is described as it may be implemented in a semiconductor fabrication facility, the invention is not so limited and may be applied to other manufacturing environments. The techniques described herein may be applied to a variety of workpieces including, but not limited to, microprocessors, memory devices, digital signal processors, application specific integrated circuits (ASICs), or other similar devices. The techniques may also be applied to workpieces other than semiconductor devices.

As is described in more detail below, in accordance with one or more embodiments of the present invention, the cumulative effects (e.g., oxide loss, thermal budget, etc.) of the processes on the wafers are controlled to achieve a desired result. Controlling the cumulative wafer effects enables one to streamline the overall semiconductor process by increasing the overall throughput and reducing the number of wafers that may be lost because of misprocessing.

The system 100 includes a plurality of processing tools 105(1-n). In the illustrated embodiment, the processing tools 105(1-n) are coupled to respective equipment interfaces (EI) 110 (shown as EI 110(1-n) in FIG. 1). Each of the equipment interfaces 110 retrieves various operational data from its respective processing tool 105, and communicates this data to an Advanced Process Control (APC) framework 120 to determine whether the processing tool 105 is experiencing faulty operation. Each equipment interface 110 may further receive control signals from the APC framework 120 that may be used to control the respective processing tool 105. For example, a control signal from the APC framework 120 may be used to shut down the first processing tool 105(1) if the operational data that was sent by the first equipment interface 110(1) was deemed faulty by the APC framework 120. As utilized herein, the term "operational data" may include data related to the processing of the workpieces, metrology data, and the like.

Exemplary processing tools 105(1-n) for a semiconductor device fabrication environment include photolithography steppers, etch tools, deposition tools, polishing tools, rapid thermal processing tools, test-equipment tools, implantation tools, etc. In one embodiment, the processing tool 105 may be a multi-chambered processing tool.

The processing tools 105(1-n), in one embodiment, may be downstream to each other. That is, the second processing tool 105(2) may be downstream to the first processing tool 105(1), the third processing tool 105(3) may be downstream to the second processing tool 105(2), and so forth. As such, a workpiece that is processed by the first processing tool 105(1) may, for example, be provided to the second processing tool 105(2), which may further process the workpiece before it is processed by the next processing tool 105(3). This process may continue until the last processing tool 105(n) has completed processing the workpiece.

The processing tools 105(1-n) of the system 100, in one embodiment, may perform various processing steps to create a packaged semiconductor device. For example, the processing tools 105(1-n) may be used for manufacturing the raw semiconductor material, slicing the semiconductor crystal ingot into individual wafers, fabricating (e.g., etching, doping, ion implanting) the wafers, testing and packaging the completed semiconductor devices, and the like. The number of processing tools 105(1-n) employed in the system 100 may be implementation specific, and thus may vary from one embodiment to another depending on the particular processing steps desired.

Generally, each processing tool 105 performs selected processing steps in accordance with a recipe defined for the workpiece to be processed in the processing tool 105. Furthermore, each recipe may define more than one processing step that can be performed by the processing tool 105. In one embodiment, the processing tool 105 may process a plurality of workpieces at any given time under the control of a recipe, where, for example, the workpieces may be at varying process stages as they are processed by the processing tool 105. The concept of accepting and then processing more than one workpiece at any given time is sometimes referred to as "batch processing." In the illustrated embodiment, the "workpieces" are semiconductor wafers that are capable of being processed by the processing tools 105(1-n).

The processing tools 105(1-n) may include one or more internal sensors (not shown) for measuring operational data, which may then be transmitted through the associated EI 110 of the processing tools 105(1-n). In addition to internal sensors, the processing tools 105 may also be coupled to respective external sensors 115(1-n). The sensors 115(1-n) measure additional operational data that may or may not be ascertained by the associated processing tool 105 itself. For example, the sensor 115 may be used to determine a temperature range or other environmental or ambient data near or around the associated processing tool 105. In alternative embodiments, the sensor 115 may be used to sense various other operational parameters associated with the processing tool 105, and, thus, need not be limited to the aforementioned examples. It should be appreciated that, in one embodiment, some or all of the features of the sensors 115(1-n) may be integrated within the processing tools 105(1-n) themselves.

The sensor 115 may be embodied as a simple data acquisition program, such as a C++ standalone program acquiring data from a thermocouple wire. Alternatively, the sensor 115 may be embodied as a full-fledged LABVIEW application, acquiring data through multiple transducers (not shown). It will further be appreciated that the sensor 115 need not be used at all, and the APC framework 120 may rely upon the operational data forwarded from the processing tool 105. If used, in one embodiment, the sensor 115 forwards the additional operational data to the APC framework 120 for analysis.

The APC framework 120 may be any one of a variety of arrangements that facilitates communications to and from the processing tools 105(1-n). An exemplary information exchange and process control framework suitable for use in the manufacturing system 100 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI. In one embodiment, the APC framework 120 may include a control unit 121 that manages the communications to and from the APC framework 120. The control unit 121 may also control the overall operations of one or more of the processing tools 105(1-n).

The system 100 includes a processor-based system 122 having a control unit 123, a storage unit 124, and a cumulative effect (CE) module 130. Although not shown, the processor-based system 122 may include an interface to communicatively couple with the processing tool 105 via the APC framework 120. The CE module 130, as explained in greater detail below, tracks the cumulative effects of the processes on the wafers processed by the processing tools 105(1-n). In the illustrated embodiment, the CE module 130 is implemented in software, although in alternative embodiments the CE module 130 may be implemented in hardware or firmware as well.

It should be appreciated that the illustrated components shown in the block diagram of the system 100 in FIG. 1 are illustrative only, and that, in alternative embodiments, additional or fewer components may be utilized without deviating from the spirit or scope of the invention. For example, in one embodiment, the one or more processing tools 105 may not have an external sensor 115. Additionally, it should be noted that although various components, such as the equipment interface 110 of the system 100 of FIG. 1, are shown as stand-alone components, in alternative embodiments, such components may be integrated into the processing tool 105. Similarly, the processor-based system 122 may be integrated into the APC framework 120.

Figure 2:
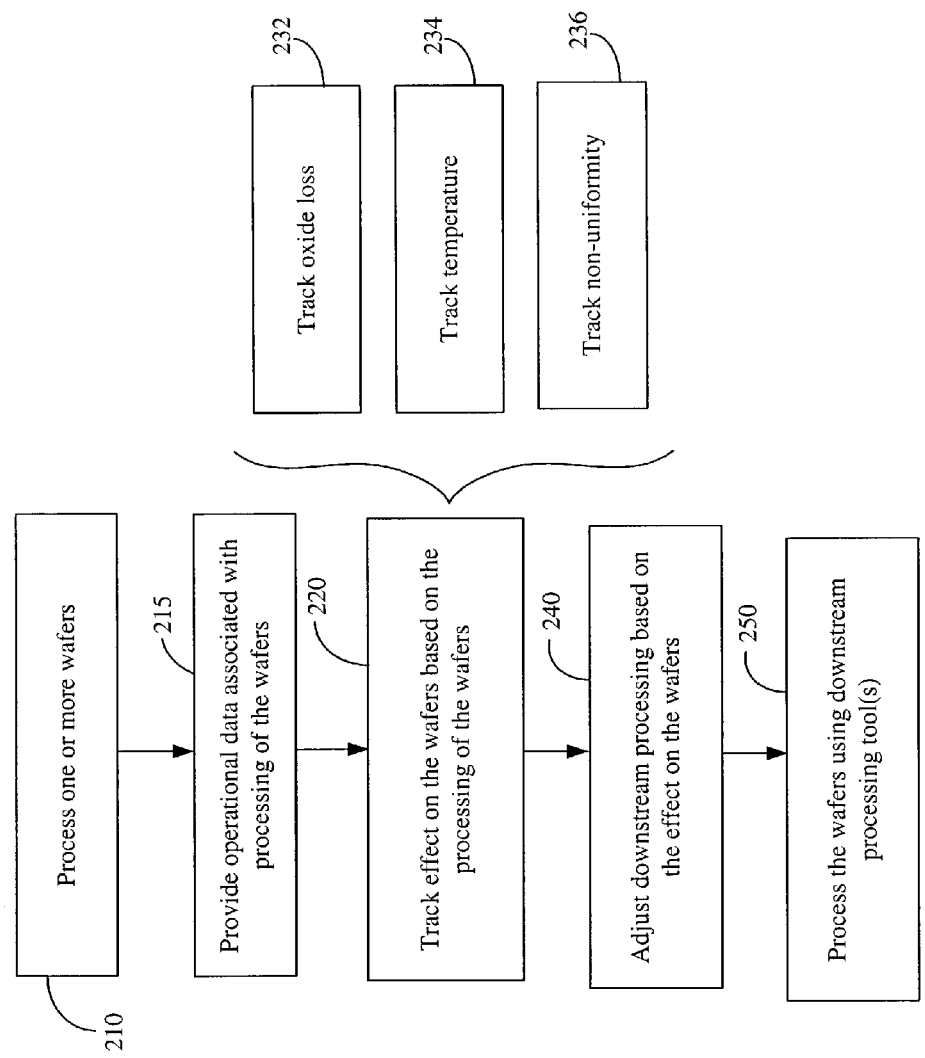
FIG. 2 illustrates a flow diagram of a method that may be implemented in the manufacturing system of FIG. 1, in accordance with one embodiment of the present invention.

Referring now to FIG. 2, a flow diagram of a method is illustrated, in accordance with one embodiment of the present invention. The method of FIG. 2 describes one embodiment of tracking the cumulative wafer effects, and taking corrective actions if appropriate, as the wafers are processed by the processing tools 105(1-n) in the manufacturing system 100. As mentioned, cumulative effects may include erosion of deposited material (e.g., oxide), exposing the wafers to elevated temperatures, causing non-uniformity by depositing material on the wafers unevenly, and the like.

Generally, wafers may take a variety of paths through the manufacturing system 100 as they are processed by the various processing tools 105(1-n) before arriving at the final product. For ease of illustration, the method of FIG. 2 is described in the context of the manufacturing system 100, where the processing tools 105(1-n) process the wafers sequentially, starting from the first processing tool 105(1) followed by one or more of the downstream processing tools 105(2-n).

The first processing tool 105(1) processes (at 210) one or more wafers. In one embodiment, the first processing tool 105(1) may process a batch of wafers at a time. The first processing tool 105(1), upon processing the wafer, provides (at 215) operational data associated with the processed wafers to the processor-based system 122. The type of operational data provided may depend on the type of process performed by the processing tool 105(1), as explained below. In one embodiment, the operational data associated with the processed wafers may be provided by the EI 110, the sensor 115, or any other desirable source.

The CE module 130 tracks (at 220) the effect on wafers based on the processing (at 210) of the wafers. The cumulative wafer effect may be tracked (at 220) based on the operational data provided (at 215). The type of effect tracked may be implementation specific. In one embodiment, tracking the cumulative wafer effect (at 220) may include tracking (at 232) the oxide loss (or other material) on the wafers, tracking (at 234) the temperature exposure of the wafers, or tracking (at 236) the non-uniformity of the material deposited on the wafers. Typically, there is a target amount of cumulative effect for each of the various types of wafer effects. As such, by tracking the contribution through individual processes, in accordance with one embodiment of the present invention, it is possible to estimate the total amount of cumulative wafer effect at any given point of time.

Based on the wafer effect caused by individual upstream processes, the processor-based system 122 adjusts (at 240) the downstream processes to substantially achieve the overall desired target (i.e., cumulative wafer effect target). For example, assuming that the effect being tracked is the loss of oxide (at 232) and it is determined that previous process resulted in excess amount of oxide loss, the processor-based system 122 may adjust (at 240) the recipe parameters of the downstream processing tools 105(2-n) to mitigate future loss of oxide, if possible.

An additional example includes adjusting (at 240) the levels of temperature to which the wafers are exposed during downstream processing. That is, typically there is an overall thermal budget that is associated with the process design to keep the level of elevated temperatures of the wafers relatively constant. An increase in temperature may be caused, for example, when the wafers processed by a rapid thermal anneal processing tool that may perform the steps of increasing the temperature to a preselected value, waiting some interval before increasing the temperature to a new preselected value, and detecting if the new temperature is within a desired range and letting the wafer cook until the implanted impurities anneal. An increase in temperature may also be caused by a hotplate of a photolithography processing tool or by other processing tools 105(1-n) capable of increasing the temperature levels. If it is determined that the wafers have been exposed to elevated temperatures (at 234) to a point that the thermal budget may be (or is) exceeded, the processor-based system 122 may adjust (at 240) the downstream processing by reducing the exposure of the wafers to high temperatures. One way of reducing the exposure of the wafers to high temperatures may include delaying the processing of the wafers by a preselected amount of time, thereby allowing the wafers to cool down.

Upon adjusting (at 240) the downstream processing parameters, the downstream processing tool(s) 105(2-n) process the wafers to substantially achieve the desired goal. Although the method of FIG. 2 is described in the context of the manufacturing system 100 of FIG. 1, it should be appreciated that, in one embodiment, the method of FIG. 2 may be implemented in a single processing tool 105 that is capable of performing multiple processes. In the case of a single processing tool 105 that is capable of performing multiple processes, the order in which the processes are performed determines the hierarchy of the processes. That is, the first process performed on the wafer would be the upstream process, with the second process being downstream to the first process, the third process being downstream to the first and second processes, and so forth.

In accordance with one or more embodiments of the instant invention, the manufacturing process may be improved by tracking the cumulative wafer effects throughout the manufacturing process, and then, if possible, adjusting the downstream processing of the wafers to reach a cumulative goal. Adjusting the downstream process to account for aberrations caused by upstream processes may increase the overall throughput as fewer wafers are wasted or otherwise lost to misprocessing.

The various system layers, routines, or modules may be executable by the control units 121, 123 (see FIG. 1). As utilized herein, the term "control unit" may include a microprocessor, a microcontroller, a digital signal processor, a processor card (including one or more microprocessors or controllers), or other control or computing devices. The storage unit 124 (see FIG. 1) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
determining an overall cumulative target value associated with processing of a workpiece in the manufacturing system comprising at least a first and second process, wherein the overall cumulative target value represents a threshold value of a processed characteristic of the workpiece spanning at least the first and second processes, wherein the second process is downstream to the first process;
processing the workpiece using the first process;
measuring at least one characteristic of the processed workpiece;
comparing the measured characteristic to the overall cumulative target value; and
adjusting the second process based on the comparison.

2. The method of claim 1, wherein the workpiece is a semiconductor wafer, wherein measuring the at least one characteristic comprises determining at least one of erosion of deposited material and temperature characteristics associated with the processing of the semiconductor wafer.

3. A method, comprising:
processing a workpiece;
determining a cumulative effect of the processing on the workpiece;
comparing the determined cumulative effect to a reference target value;
adjusting a downstream process of the workpiece based on comparing the determined cumulative effect to the reference target value, wherein the workpiece is processed by the adjusted downstream process,
wherein the workpiece is a semiconductor wafer, wherein determining the cumulative effect of the processing comprises determining at least one of erosion of deposited material and temperature characteristics associated with the processing of the semiconductor wafer; and
wherein the deposited material is oxide, wherein comparing the determined cumulative effect comprises comparing the determined cumulative effect to an cumulative target value for oxide loss associated with the semiconductor wafer.

4. The method of claim 1, wherein adjusting the second process comprises adjusting process recipes to substantially achieve the overall cumulative target value.

5. The method of claim 1, wherein the workpiece is a semiconductor wafer, wherein measuring the at least one characteristic comprises determining a temperature characteristics associated with the processing of the semiconductor wafer.

6. The method of claim 5, wherein the overall cumulative target represents the thermal budget value of with the semiconductor wafer spanning the first and second processes.

7. The method of claim 6, wherein adjusting the second process comprises adjusting one or more process recipes executed by downstream processing tools to substantially achieve the overall cumulative thermal budget value.

8. The method of claim 1, wherein processing the workpiece comprises processing a lot of semiconductor wafers.

9. An apparatus, comprising:
an interface; and
a control unit communicatively coupled to the interface, the control unit adapted to:
receive a measurement associated with at least one characteristic of a processed workpiece, wherein the workpiece is processed by a first process;
compare the measurement with an overall cumulative target value, wherein the overall cumulative target value represents a threshold value of the at least one characteristic of the processed workpiece covering at least the first process and a process downstream to the first process;
adjust the downstream process based on the comparison.

10. The apparatus of claim 9, wherein the control unit is adapted to adjust at least one parameter of one or more processing recipes of downstream processing tools based on the comparison.

11. The apparatus of claim 10, wherein the control unit is adapted to track a cumulative effect of oxide loss associated with the workpiece.

12. The apparatus of claim 10, wherein the workpiece is a wafer, wherein the control unit is adapted to track a temperature associated with the wafer.

13. The apparatus of claim 12, wherein the control unit is adapted to lower a temperature associated with the wafer if the temperature exceeds a thermal budget of the wafer.

14. The apparatus of claim 10, wherein the control unit is adapted to track the cumulative effect based on processing of a lot of workpieces.

15. An article comprising one or more machine-readable storage media containing instructions that when executed enable a processor to:
receive a measurement associated with at least one characteristic of a processed workpiece, wherein the workpiece is processed by a first process;
compare the measurement with an overall cumulative target value, wherein the overall cumulative target value represents a threshold value of the at least one characteristic of the processed workpiece covering at least the first process and another process downstream to the first process;
adjust the downstream process based on the comparison.

16. The article of claim 15, wherein the workpiece is a wafer, wherein the instructions when executed enable the processor to adjust at least one parameter of one or more processing recipes of downstream processing tools based on the comparison.

17. The article of claim 16, wherein the instructions when executed enable the processor to track a cumulative effect of oxide loss associated with the wafer.

18. The article of claim 16, wherein the instructions when executed enable the processor to track a temperature associated with the wafer.

19. The article of claim 16, wherein the instructions when executed enable the processor to track a cumulative effect based on processing of a lot of wafers.

20. A system, comprising:
a processing tool adapted to:
process a workpiece; and
provide operational data associated with the processing of the workpiece; and
a processor-based system adapted to:
determine at least one characteristic of a processed workpiece based on the operational data;
compare the determined characteristic of the processed workpiece with an overall cumulative target value, wherein the overall cumulative target value represents a threshold value of the at least one characteristic of the processed workpiece covering at least the processing tool and another downstream tool to the processing tool;
adjust the downstream processing tool based on the comparison.

21. The system of claim 20, further comprising an advanced processing control framework coupled between the processing tool and the processor-based system.

22. An apparatus, comprising:
means for determining an overall cumulative target value associated with processing of a workpiece in a manufacturing system comprising at least a first and second process, wherein the overall cumulative target value represents a threshold value of a processed characteristic of the workpiece spanning at least the first and second processes, wherein the second process is downstream to the first process;
means for processing the workpiece using the first process;
means for measuring at least one characteristic of the processed workpiece;
means for comparing the measured characteristic with the overall cumulative target value; and
means for adjusting the second process based on comparing the means for the determined cumulative effect to the reference target value.

* * * * *